(12) United States Patent
Petri et al.

(10) Patent No.: US 7,240,247 B2
(45) Date of Patent: Jul. 3, 2007

(54) PROVIDING A CHAIN OF TOKENIZED ERROR AND STATE INFORMATION FOR A CALL STACK

(75) Inventors: Robert J. Petri, Santa Clara, CA (US); Greg Limes, Tallahassee, FL (US); Layne B. Miller, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 1162 days.

(21) Appl. No.: 10/133,625

(22) Filed: Apr. 29, 2002

(65) Prior Publication Data

US 2003/0204804 A1    Oct. 30, 2003

(51) Int. Cl.
   *G06F 11/00* (2006.01)
(52) U.S. Cl. .......................................... 714/57; 714/48
(58) Field of Classification Search .................. 714/57; 717/133
   See application file for complete search history.

(56) References Cited

U.S. PATENT DOCUMENTS

| | | | |
|---|---|---|---|
| 5,297,263 A * | 3/1994 | Ohtsuka et al. | 712/244 |
| 5,500,944 A * | 3/1996 | Yoshida | 714/47 |
| 5,740,354 A * | 4/1998 | Ben-Natan et al. | 714/45 |
| 5,974,568 A * | 10/1999 | McQueen | 714/38 |
| 6,363,503 B1 * | 3/2002 | Clauss et al. | 714/57 |
| 6,378,087 B1 * | 4/2002 | Flanagan et al. | 714/38 |
| 6,604,208 B1 * | 8/2003 | Gosselin et al. | 714/4 |
| 6,615,374 B1 * | 9/2003 | Moran | 714/48 |
| 7,039,833 B2 * | 5/2006 | Knuutila et al. | 714/38 |
| 2003/0037291 A1 * | 2/2003 | Goldsmith et al. | 714/38 |

OTHER PUBLICATIONS

Intel, Intel IXA SDK ACE Programming Framework SDK 2.0 Reference, Aug. 2001, Revision 3.3, pp. xix, xx, 1, 14, 131-134, 141-153.*

* cited by examiner

*Primary Examiner*—Scott Baderman
*Assistant Examiner*—Paul F. Contino
(74) *Attorney, Agent, or Firm*—Pillsbury Winthrop Shaw Pittman LLP (57) ABSTRACT

An arrangement is provided for generating an error chain in a call stack. A function is invoked to perform a functionality. If an error occurs during performing the first function, errors including the ones contained in an error chain, created based on at least one context specific error state and represented by an error tokan, and the error, occurred during said performing the functionality, are processed. The function then returns to another function that invokes it either with a new token error token representing a new error chain containing the error occurred and the errors contained in the error chain or with an error status. If the function does not error, it returns a normal status to the other function that invokes it.

22 Claims, 8 Drawing Sheets

PROVIDING A CHAIN OF TOKENIZED ERROR AND STATE INFORMATION FOR A CALL STACK

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to data transmission. Other aspects of the present invention relate to authenticated data transmission.

In the age of computers, software systems are developed to facilitate various types of services. For example, a bank may develop a series of programs running on a computer and interacting with either a bank personnel or a user to perform different banking tasks. A corporation may develop its web site, offering not only information about the company but also sales of its products.

An application program, simple or complex, is often organized as a hierarchy of functions or subroutines, each of which performs a pre-determined and well-defined functionality. Invoking combinations of different functions allows a system to perform diversified tasks. For example, an application system may invoke first a function to perform calculation of cost of a sale, which subsequently invokes another function, responsible for printing, to print out the calculated cost sheet. In a different task, it may first invoke a function that performs a web-based transaction, which then invokes the same printing function to print out, over the web, a transaction agreement. The printing function here is invoked by different functions and, in both instances, the printing function is running at a lower level in a call stack. In the first task, the underlying call stack consists of at least two levels, including the function to calculate a sale cost and the printing function. In the second task, the underlying call stack consists of also at least two levels, one is the function performing a web-based transaction and the other is the printing function.

At run time, a function in a call stack may error. Such an error may lead to a chain effect. That is, if a called function errors and fails to produce the result its calling function desires, the calling function may subsequently generate errors as well due to a subsequent effect of failing to perform pre-determined functionality using the desired result from its called function. In many software systems, each function that errors may independently output error codes. Such produced error codes are often limited to only programmatic errors. In addition, when a called function errors and outputs its error codes, its calling function may error as well and produce different error codes. In reality, when a running system fails to perform, operators depend on such error codes to determine the cause of the failure and correct the system based on the identified cause. Since most error codes are far from human readable or reasonably understandable, diagnosing the root cause of a run time error often requires extensive expertise and familiarity with the internal design of the software system. This requirement is not only demanding but also often unrealistic.

In a complicated computer application system, a call stack may become very deep. In this case, identifying the root cause based on a long list of error codes without the information associating the error codes from different levels of functions can be a daunting task. Even when human readable error information is provided, since it is often made available immediately after a function call returns, it requires an operator to handle associated error message immediately after the error is reported. In a real scenario, especially with a complex system having a deep call stack, it is usually not feasible.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein:

FIGS. 2(a) and (b) illustrate exemplary constructs of an error token and a context specific error state, according to embodiments of the present invention;

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
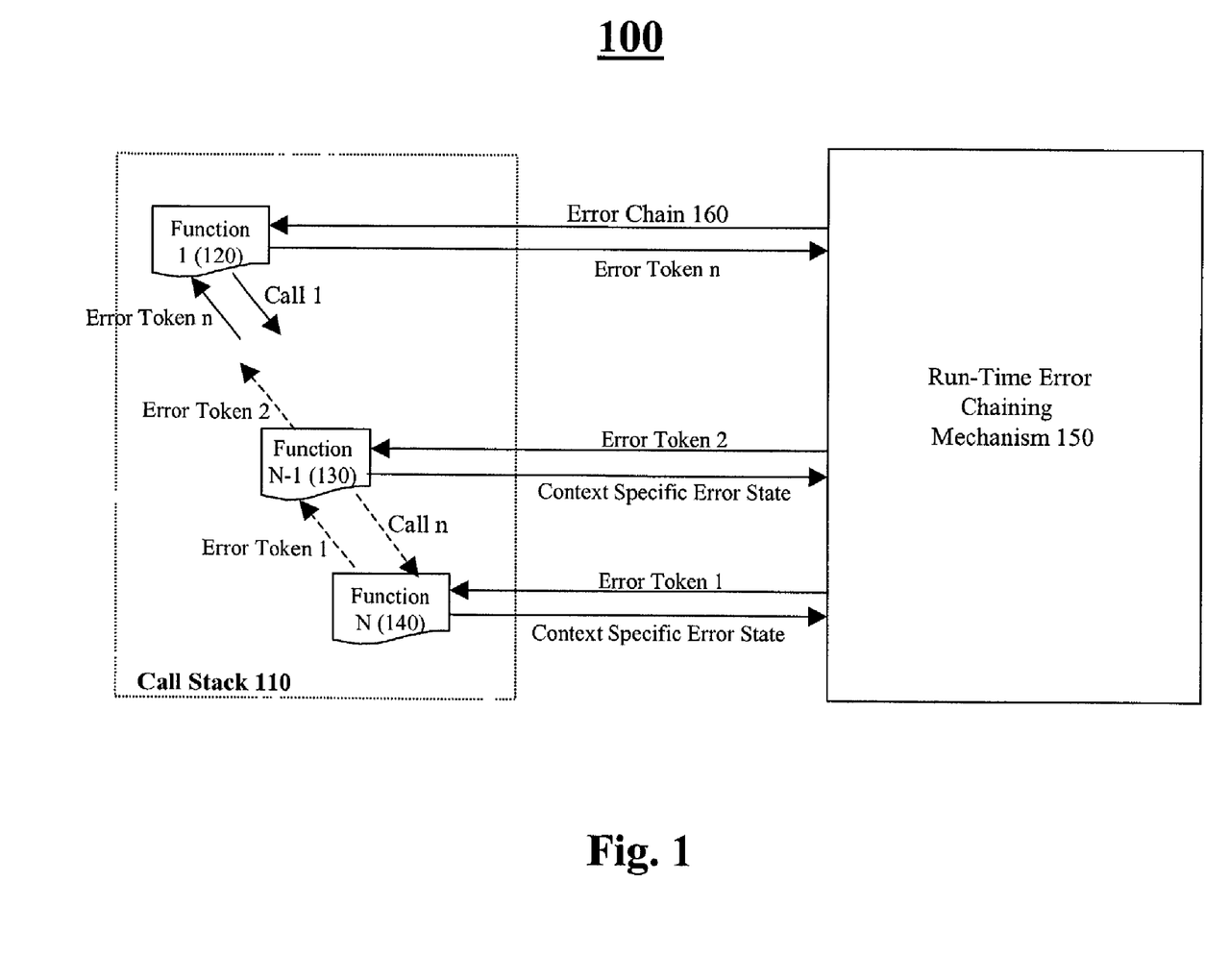
FIG. 1 depicts a framework with a run time error chaining mechanism enabling the generation of an error chain with human understandable description of run time errors occurred in a series of function calls, according to embodiments of the present invention.

FIG. 1 depicts a framework 100 with a run time error chaining mechanism 150 enabling the generation of an error chain 160, represented by a set of error tokens, containing human understandable context specific error state descriptions of run time errors occurred during function calls in a call stack 110. In the call stack 110, there are a plurality of functions, function 1 120, . . . , function N−1 130, and function N 140. During run time, functions are called to perform some pre-determined functionalities. For example, function 1 120 may call function 2 (not shown in FIG. 1) and function N−1 130 may call the function N 140 to perform certain functionality.

When a function is called during run time, error may occur and such error sometimes may lead to a chain effect which propagates the error from the called function back to its calling functions. For example, multiple errors occurred in a top level function of the call stack 110 (e.g., function 1 120) may due to a single run time error from a lower level function (e.g., function N 140) in the same call stack. Clear description about the errors at different levels may provide a basis for understanding the cause and subsequently effectively remove the run time error.

In the framework 100, the call stack 110 comprises a plurality of N functions and the function 1 120 is a top level calling function and the function N 140 is a called function at the lowest level of the call stack 110. Here, the lowest level may be defined as the lowest level at which an error occurs. That is, the call stack 110 may involve a subset of all functions in a call stack in which all functions at a level lower than the function N 140 results in no error. That is, the function N 140 corresponds to a first function in which a run time error occurs.

Since a run time error occurred in a particular function is usually related to the function itself or the context in which the function operates, the description of the error may be formed within the function where the error occurred. A function may be programmed to include various run time error handling procedures which, when invoked, may generate appropriate information that provides both human understandable description of a underlying run time error as well as the context (running environment) under which such error occurred. For example, when the function N 140 is in error, it may generate an error description specific to the context in which its error arises.

In a call stack, run time error messages from different levels may be used to form an error chain. That is, run time error information generated at lower levels of a call stack may be linked to form a chain of error messages that can be accessed at a high level. For example, context specific error descriptions from the function N 140 may be propagated back to its caller, the function N−1 130, and further to the calling function of the function N−1 130. In this fashion, at the top level of a call stack, such chained error descriptions may be accessed and used to interpret the cause of run time errors. In framework 100, the run time error chaining mechanism 150 enables the linking of context specific error states from different levels of the call stack 110.

To propagate context specific error information to form an error chain, a function in which a run time error has occurred first generates corresponding context specific error state and passes such information to the run time error chaining mechanism 150. The run time error chaining mechanism 150 then appends the received error information into an error chain, generates an error token to represent the appended error chain, and sends the error token back to the function.

The error token representing the appended error chain contains the error information from all the functions from lower levels than the function itself. For example, when a run time error occurs in the function N 140, it generates its context specific error state and sends such error information to the run time error chaining mechanism 150 (as shown in FIG. 1). If it is a first run time error, the run time error chaining mechanism 150 initiates a new error chain and inserts the context specific error state from the function N 140 into the initiated error chain. It then generates an error token 1 and sends it to the function N 140 to represent the new error chain.

The function N 140 passes the error token 1 representing the new error chain to its calling function, the function N−1 130. The function N−1 130 may generate its own context specific error state and appends such error information to the new error chain. To achieve that, the function N−1 130 sends its context specific error state, together with the error token 1 (received from the function N 140), to the run time error chaining mechanism 150.

Using the error token 1, the run time error chaining mechanism 150 accesses the error chain initiated previously and appends the current context specific error state from the function N−1 130, to it. The run time error chaining mechanism 150 then generates a new error token, or error token 2 (see FIG. 1), to represent the appended error chain and sends error token 2 to the function N−1 130. The process may repeat until it reaches the function 1 120 that receives an error token n representing an error chain containing the error information appended from all the lower level functions.

At the top level, the function 1 120 may determine to report the error message stored in the error chain represented by the error token n. In this case, it may simply send the error token n to the run time error chaining mechanism 150 to request to retrieve the error chain and report the error states described in the retrieved error chain. The function 1 120 in FIG. 1 may not necessarily be the top level calling function in the call stack 110. It may represent a calling function that, instead of appending error information to the error chain, decides to report all the errors generated so far. A decision to report instead of to append may be made based on some pre-determined criterion such as a maximum number of errors that can be accumulated in an error chain (e.g., such a maximum may be determined so that not too many errors are reported at any single time or according to the size of an allocated error chain).

FIG. 2(a) illustrates an exemplary construct of an error token, according to an embodiment of the present invention. An error token 210 comprises a fingerprint 220 and an error buffer index 230. The fingerprint 220 corresponds to a signature of an error in an error chain. It is used to validate the element in the error chain that holds the underlying error. For example, if the fingerprint 220 in an error token matches the fingerprint in an element of an error buffer, it may indicate that the underlying element in the error chain is valid. If the two do not match, it may indicate that the element has been recycled and used for other purposes.

Figure 3:
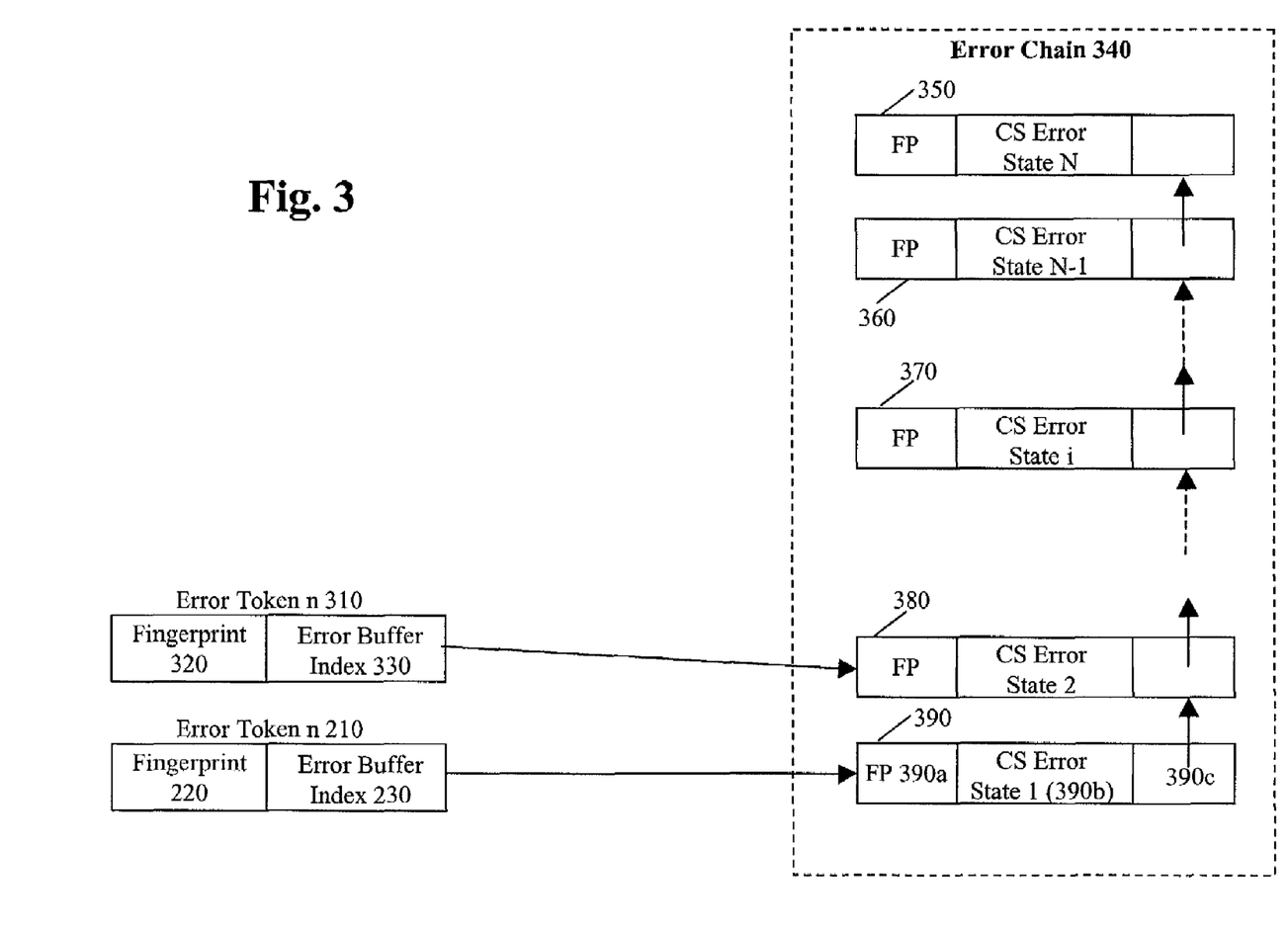
FIG. 3 describes the relationship between error tokens and the error chain that they represent, according to an embodiment of the present invention.

The error buffer index 230 is an index to an error buffer element in an error chain where the underlying error chain starts. FIG. 3 illustrates the relationship between error tokens and an underlying error chain, according to an embodiment of the present invention. Error chain 340 comprises of a plurality of buffer elements 350, 360, . . . , 370, . . . , 380, 390. Each of the elements may correspond to a single function and store the context specific error state of the corresponding function as well as the information that links to other elements in the error chain. In error chain 340, higher level elements point (link) to lower level elements. For example, the last element in an error chain may correspond to the function at the lowest level of the call stack 110. In FIG. 3, the element 350 may correspond to the function N 140 and it stores the error information generated by the function N 140.

Each element in an error chain may include a plurality of attributes such as a fingerprint, a context specific error state, and a link that points to the next lower element in the error chain. For example, the element 390 includes a fingerprint 390a, a context specific error state 1 (e.g., corresponding to the function 1 120 at the top level in the call stack 110) 390b, and a link 390c that indexes to the next lower element in the error chain 340 (the, element 380). Here the link 390c may correspond to an error token with both the index to an error element as well as a validating fingerprint corresponding to the lower level element. Each of the elements in the error chain 340 possesses distinct same fingerprint, which may be generated when the element is initiated.

The error token 210 represents the element 390 in the error chain 340. It is generated by the run time error chaining mechanism 150 and returned to the function 1 120. The error token 210 may be generated with a fingerprint consistent with the fingerprint 390a used in the element 390 in the error chain 340. The error token may be generated also with the error buffer index 230 that corresponds to the address of the element 390 where the error message from the function 1 120 is stored. The error token 210 represents the element 390 which is the first element of the error chain starting from the element 390 to the element 350.

An error chain may be generated by appending the error state from each of the called functions in a reverse order of these functions being called. Whenever a function appends an error chain, it receives an error token representing the element containing its own error messages in an error chain including also the error messages in the previous error chain from lower level functions. That is, from each error token, a different portion of the error chain 340 can be accessed. A top level function (e.g., the function 1 120) has an error token that represents the top element of an error chain from where the full length of the error chain can be accessed. A function at the lowest level of a call stack has an error token from where only the error messages from the same function can be accessed. For example, the function 1 120 has an error token (e.g., error token 210) leading to an error chain starting from the element 390 to the element 350 (the entire error chain). The function called by the function 1 120 has an error token 310 leading to an error chain starting from the element 380 to the element 350. The function N−1 130 has an error token leading to an error chain with last two elements including the element 360 and the element 350. The function N 140 has an error token leading to an error chain having only one element, the element 350.

An error token not only leads to an error chain, it also facilitates the linking of different error elements to append the error chain. When a called function returns an error token to its calling function, the calling function may use the received error token as a handle to append its context specific error state to form an appended error chain. For example, when the function N−1 130 receives an error token 1 from the function N 140 (see FIG. 1), it sends the received error token 1 (which includes an index to the element storing the error information from the function N 140) with its own context specific error state to the run time error chaining mechanism 150. Using the error token 1, the run time error chaining mechanism 150 first identifies the previous error chain (with only one element). It then stores the context specific error state from the function N−1 130 in a new element. The new element is then linked (or appended) to the previous error chain by inserting, for example, the error buffer index from the error token 1 (representing the starting address of the previous error chain) in the new element as a link to the previous chain (see the pointer from the element 360 to the element 350 in FIG. 3). Alternatively, the entire error token 1 may be inserted in the new element. In this way, the previous error chain is appended with the new element and the new element points to the starting element of the previous error chain. A new error token representing the appended error chain (containing two elements now) is generated and returned to the function N−1 130. The new error token has a same fingerprint as the new element with a new error buffer index indexing to the new element.

Figure 2:
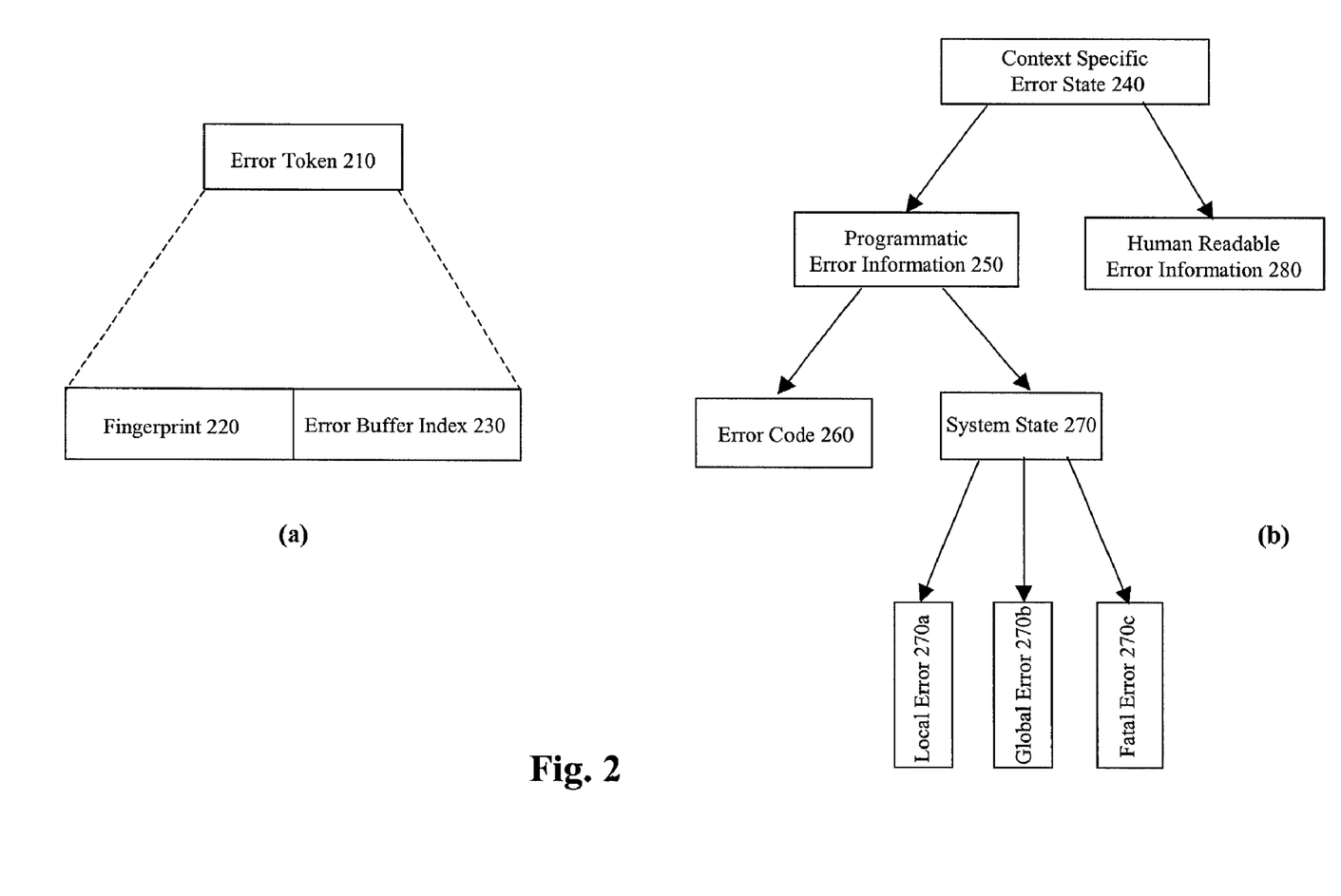

FIG. 2(*b*) illustrates an exemplary construct of a context specific error state, according to an embodiment of the present invention. A context specific error state 240 may comprise two categories of information. One is the category of programmatic error information 250, which may be expressed in terms of, for example, an error code 260 and a system state 270. The system state 270 may further include certain description such as the impact of an error on the running state of the underlying system. For example, an error description may indicate the severity of the error, which may include, but not limited to, a description of a local error 270a (that may correspond to a less severe situation), a global error 270b (that may correspond to a fairly severe situation), or a fatal error 270c (that may correspond to a very severe situation). A local error description may usually indicate that there is a localized error but it did not adversely affect the state of the overall system. A global error report may indicate that there is a major error and a part of the overall system (e.g., the error function) may be no longer in a consistent state but the overall system may still be stable. A fatal error report may indicate that the overall system is in a inconsistent state and further operation of the system is no longer possible.

The other exemplary category of a context specific error state is human readable error information 280. As mentioned earlier, the human readable error information may be incorporated in a function and may be coded in the error handling parts of the function. Such information is to provide operators with human understandable description about run time errors and their context to facilitate identification of the cause of run time errors.

Figure 4:
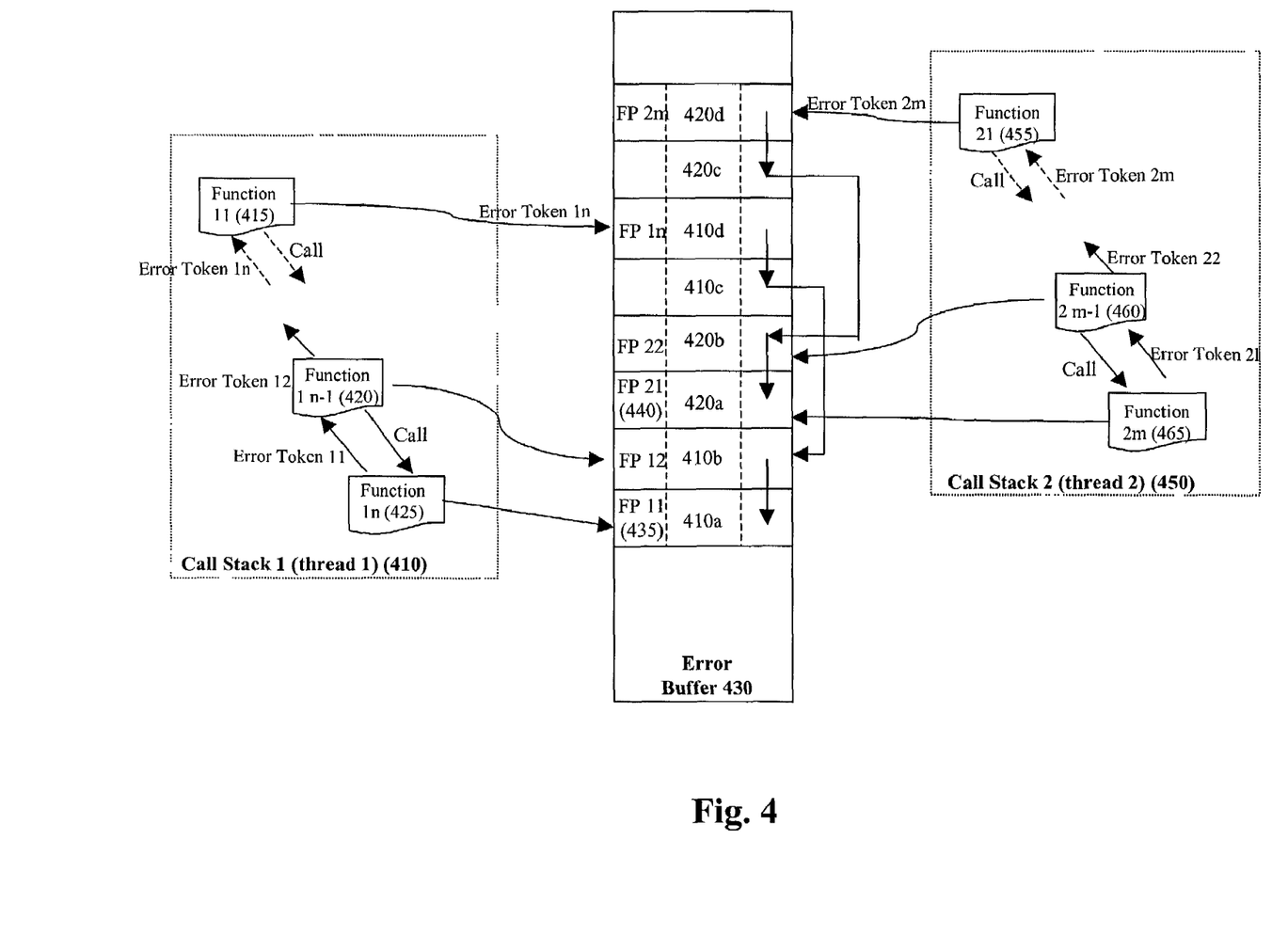
FIG. 4 illustrates how an error buffer is shared among different error chains generated by different call stacks, according to an embodiment of the present invention.

A plurality of call stacks may independently interact with the run time error chaining mechanism 150 to manage their own error chains. This is illustrated in FIG. 4, where two example call stacks 410 and 450 share a common error buffer 430 in which two separate error chains corresponding function call stacks 410 and 450 are independently initiated, appended, and managed, according to embodiments of the present invention. The call stack 410 comprises a plurality of a first set of n functions (function 11 415, . . . , function 1 n−1 420, function 1n 425). The call stack 450 comprises a plurality of a second set of m functions (function 21 455, . . . , function 2 m−1 460, function 2m 465). The function 11 415 is the top level function of the call stack 410 and the function 1n 425 is the lowest level function of the same stack. In call stack 2 450, the function 21 455 is at the top level and the function 2m 465 is at the lowest level of the call stack.

In call stack 1 410, the function 1n 425 initiates an error chain that ultimately comprises elements 410a, 410b, . . . , 410c, and 410d. When the first error chain is initiated, an error token, error token 11, is generated to represent the new error chain that has only the first element 410*a*. The error token 11 may include a fingerprint that is identical or consistent with the fingerprint 435 stored in the element 410*a*. An error buffer index in the error token 11 points to the location of the element 410*a*. The function 1n 425 returns the error token 11 to the function 1 n−1 420. The function 1 n−1 420 may invoke the run time error chaining mechanism 150 to incorporate its own error message (i.e., its context specific error state) into the new error chain. In this case, it sends the run time error chaining mechanism 150 both its context specific error state and the error token 11. The former is used to append the error chain and the latter is to be used to identify an element in the new error chain to be appended.

If the element from where the new error chain is to be appended is identified, the run time error chaining mechanism 150 inserts the context specific error state received from the function 1 n−2 420 into a new element 410*b* and then appends the new element 410*b* to the existing error chain (represented by error token 11). Specifically, it may store the error buffer index from the error token 11 (pointing to the element 410*a*) in the new element 410*b* (see the link from 410*b* to 410*a* in FIG. 4). The run time error chaining mechanism 150 further generates an error token 12 representing the new element 410*b* of the appended error chain (now with two elements 410*a* and 410*b*) and sends the error token 12 to the function 1 n−1 420. This process repeats until it reaches the function 11 415, which uses a received error token in (representing an error chain containing the error information from all functions below the function 11 415) to retrieve the entire error chain and to report the error information.

A separate error chain of the call stack 2 450 comprising elements 420*a*, 420*b*, . . . , 420*c*, 420*d* may be formed in a similar manner via the run time error chaining mechanism 150. The function 2m 465 invokes the run time error chaining mechanism 150 to initiate the second error chain and receives an error token 21 representing the initial error chain containing only the first element 420*a*. The error token 21 is them passed to the function 2 m−1 460 which subsequently uses the error token 21 to append the second error chain. At the top level of the call stack 2 450, the function 21 455 receives an error token 2m, representing of the top element of the second error chain containing the error information from all the functions at lower levels. The function 21 455 retrieves the second error chain using the error token 2m and reports the error messages. Although both the first error chain (410*a*, 410*b*, . . . , 410*c*, 410*d*) and the second error chain (420*a*, 420*b*, . . . , 420*c*, 420*d*) share the error buffer 430, they may be formed and manipulated independently and asynchronously by the run time error chaining mechanism 150.

Figure 5:
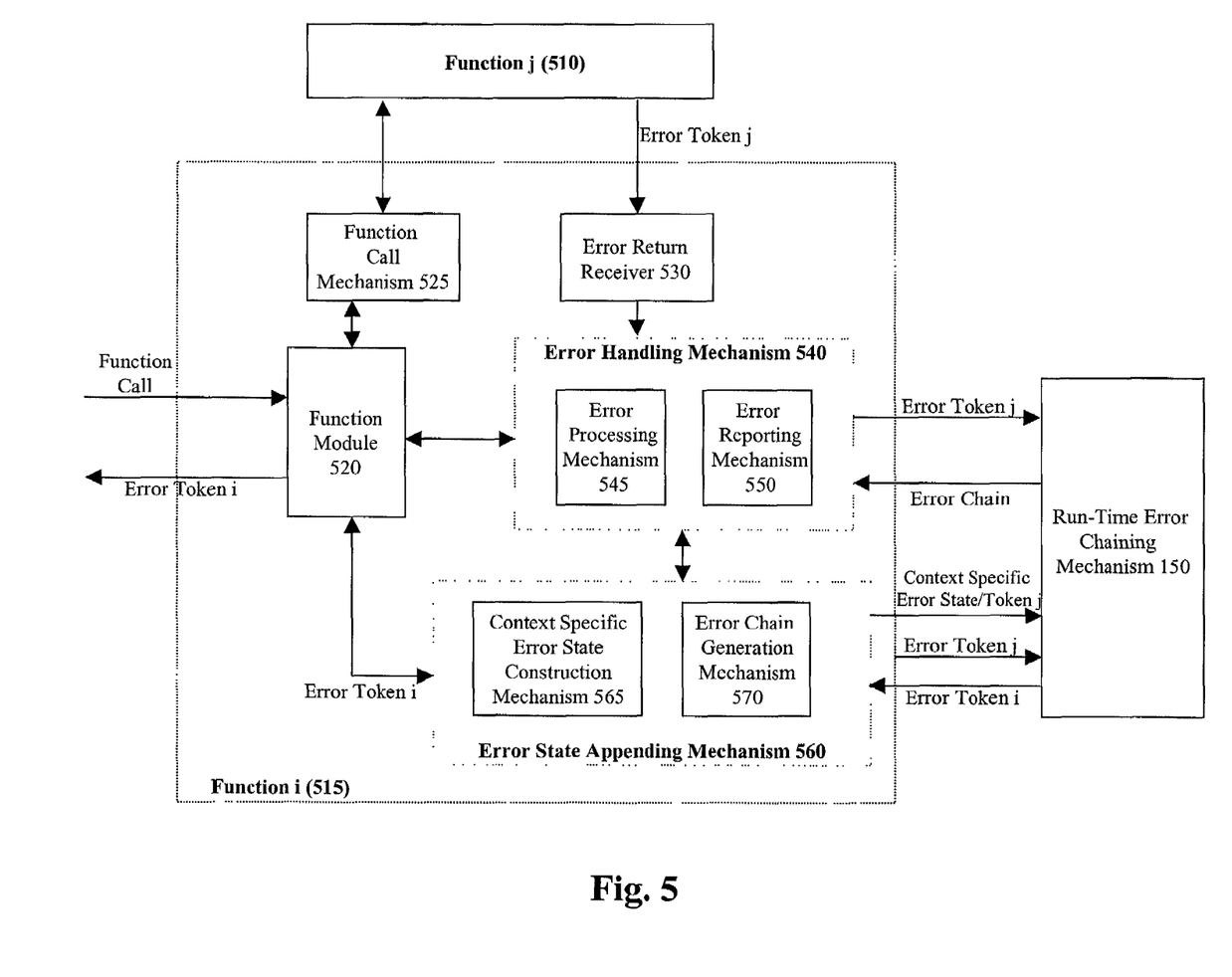
FIG. 5 depicts the high level block diagram of a called function, in relation to its called function as well as to a run time error chaining mechanism, according to embodiments of the present invention.

FIG. 5 depicts a high-level functional block diagram of a called function i 515, in relation to its called function j 510 as well as to the run time error chaining mechanism 150, according to embodiments of the present invention. The called function i 515 is activated, either through a function call by a calling function or invoked as a top level function, to perform a predetermined functionality. The function i 515 comprises a function module 520, a functional call mechanism 525, an error token return receiver 530, an error handling mechanism 540, and an error state appending mechanism 560.

The function module 520 carries out a pre-determined functionality. The function call mechanism 525 calls other lower level functions. The error return receiver 530 intercepts abnormal returns from the called functions when they are in error and passes on the received information (e.g., an error token) to the error handling mechanism 540. Based on the received return information, the error handling mechanism 540 processes the received error information and determines appropriate actions, including appending or reporting error messages. The error state appending mechanism 560 is responsible for generating error state information specific to the function i 515 and to integrate error information specific to the function i 515 with the error information from lower level functions.

When the function module 520 carries out a predetermined functionality, it may call, during its operation, other functions via the function call mechanism 525. For example, the function module 520 calls a function j 510 (as shown in FIG. 5). If the function module 520 is in error, the error handling mechanism 540 is invoked to process the error and to determine appropriate actions based on the nature of the error. Examples of appropriate actions include simply reporting the error and then terminating the operation or generating detailed error messages specific to the function i 515 and then passing such error information to its calling function, if any.

If the function module 520 is not in error but the error return receiver 530 intercepts error information from the function j 510, the error return receiver 530 invokes the error handling mechanism 540 to process the error information from the called function 510. Appropriate action is determined based on the nature of the returned error. The error message from the called function j 510 may be returned in the form of an error token j, representing an error chain. The error handling mechanism 540 may determine to simply report the received error and terminate the current operation. It may also determine to further generate error messages specific to the function i 515, to append such context specific error state in the error chain formed by lower level functions, and to pass the appended error chain, in the form of a new error token, error token i, to the function that calls the function i 515. To do so, the function i 515 sends the received error token j and its context specific error state to the run time error chaining mechanism 150 and receives error token i that represents the appended error chain. To propagate the error chain, the function i 515 passes the error token i to its calling function.

When no error is returned from called function j 510 and the function module 520 is not in error, the function module 520 terminates its operation with a normal status.

The error handling mechanism 540 comprises an error processing mechanism 545 and an error reporting mechanism 550 that reports errors. Depending on the error processing results, the error handling mechanism 540 may determine to simply report the gathered error information. In this case, it uses the error token j received from the called function j 510 to retrieve the underlying error chain from the run time error chaining mechanism 150 and to report the context specific error states related to lower level functions. If the error handling mechanism 540 determines to append the error state of the function i 515, it passes the error token to the error state appending mechanism 560.

The error state appending mechanism 560 comprises a context specific information construction mechanism 565 and an error chain appending mechanism 570. The former generates error state information that is relevant to the function i 515 and the latter uses the generated context specific error state information to append the error chain represented by the error token j.

If the function i 515 is a function at lowest level of a call stack (i.e., there is no returned error token j corresponding to an existing error chain), the error chain appending mechanism 570 invokes the run time error chaining mechanism 150 to initiate a new error chain instead of appending an existing error chain. In this case, the error chain appending mechanism 570 sends the generated context specific error state information to the run time error chaining mechanism 150 without an existing error token. Once the new error chain is initiated, the run time error chaining mechanism 150 sends the error chain appending mechanism 570 a new error token (error token i) representing the initiated error chain.

If there is an existing error chain represented by the error token j (received from the function j 510), to append the generated context specific error state information to the existing error chain, the error chain appending mechanism 570 sends both the error token j and the context specific error state of the function i 515 to the run time error chaining mechanism 150. In this case, the run time error chaining mechanism 150 stores the context specific error state in a new error buffer element. Upon retrieving the existing error chain based on the given error token j, the run time error chaining mechanism 150 links the new element to the existing error chain to form an appended error chain. A new error token, error token i, is then accordingly generated (with a fingerprint consistent with the fingerprint used in the existing error chain and a error buffer index pointing to the address of the newly appended element) and sent back to the error chain appending mechanism 570.

Upon receiving the error token i, representing the new error chain (either a new error chain or an appended error chain), the error chain appending mechanism 570 sends the error token i to the function module 520 so that it can be returned to the function that calls the function i 515.

Figure 6:
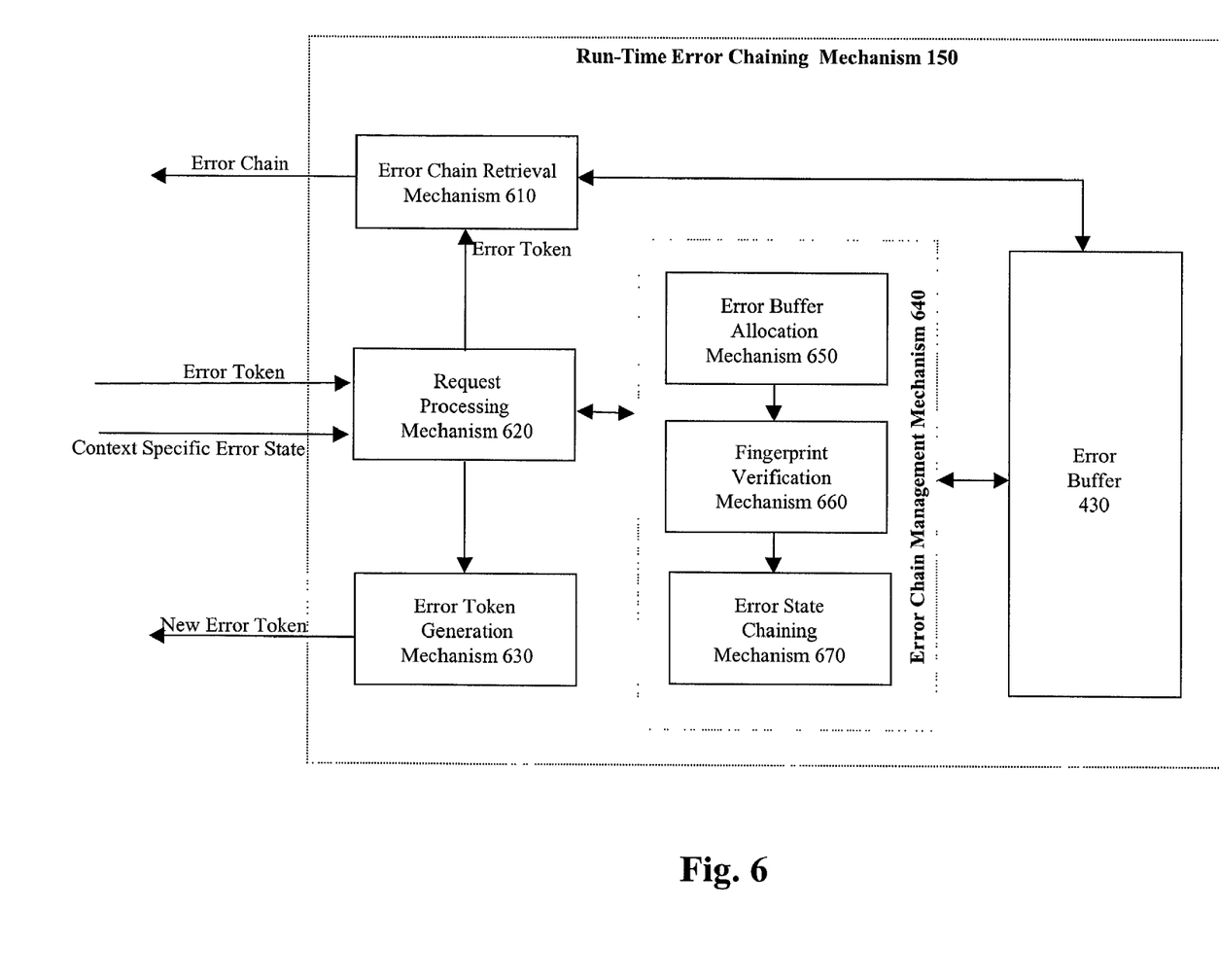
FIG. 6 depicts the internal functional block diagram of a run time error chaining mechanism, according to embodiments of the present invention.

FIG. 6 depicts the internal functional block diagram of the run time error chaining mechanism 150, according to embodiments of the present invention. The run time error chaining mechanism 150 comprises a request processing mechanism 620, an error chain retrieving mechanism 610, an error buffer 430, an error chain management mechanism 640, and a token generation mechanism 630. The request processing mechanism 620 processes a request from a function and invokes appropriate mechanism to perform requested operations.

When a function requests to append an existing error chain, an error token representing an existing error chain is sent, together with the context specific error state to be appended, to the request processing mechanism 620. Based on the request, the request processing mechanism 620 invokes the error chain management mechanism 640 with the received error token as well as the context specific error state. When a function requests to initiate a new error chain, the request processing mechanism 620 provides the error chain management mechanism 640 with only the context specific error state. Upon the completion of appending/initiating an error chain, the request processing mechanism 620 activates the token generation mechanism 630 to generate an error token to represent the appended/initiated error chain. Such generated error token is then sent back to the requesting function.

To facilitate error chain management, the error chain management mechanism 640 comprises an error buffer allocation mechanism 650, a verification mechanism 660, and an error state chaining mechanism 670. When a new error chain is requested, the error buffer allocation mechanism 650 allocates a plurality of buffer elements to the new error chain. A fingerprint for the new error chain may be issued and assigned to the elements. The verification mechanism 660 verifies the validity of an element which is to be used to append an existing error chain. The error chaining mechanism 670 stores given context specific error state in an element with the fingerprint of the error chain.

When the error chain management mechanism 640 is requested to append an existing error chain, it first identify the existing error chain using a given error token. It may then locate an available element to append the existing error chain. Prior to appending the available element to the existing error chain, the verification mechanism 660 verifies that the available element has a fingerprint that is consistent with the fingerprint in the given error token. This is to make sure that the available element allocated to the existing error token has not been recycled.

To append an existing error chain, the error state chaining mechanism 670 stores given context specific error state in an available element and links the available element to the existing error chain by storing the error buffer index of the given error token representing the existing error chain (pointing to the starting address of the existing error chain) in the available element.

If a function requests to retrieve an existing error chain represented by an error token, the request processing mechanism 620 activates the error chain retrieval mechanism 610 with the given error token. Using the provided error token, the error chain retrieval mechanism 610 retrieves the corresponding error chain and returns the retrieved error chain back to the requesting function.

Figure 7:
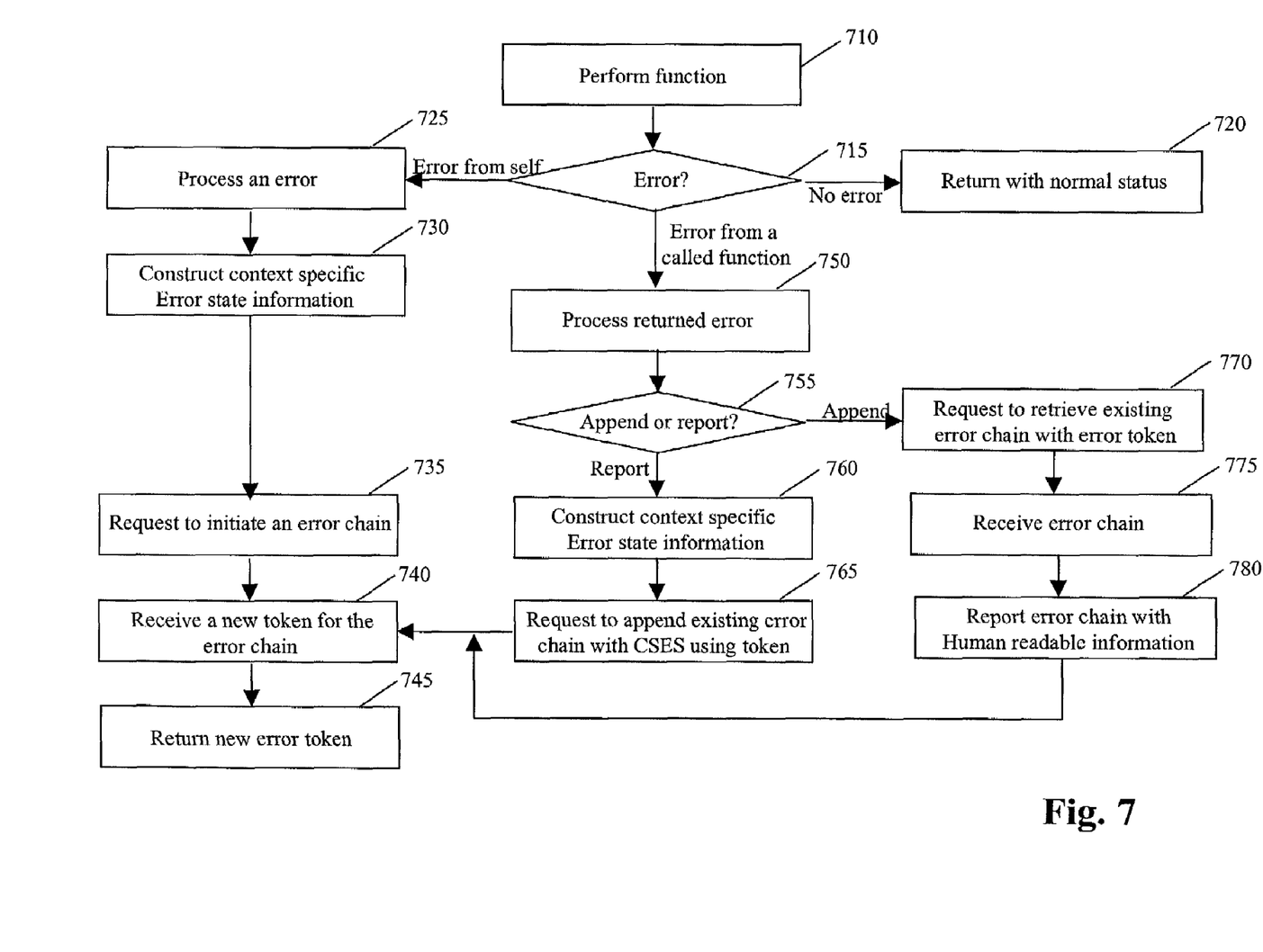
FIG. 7 is an exemplary flowchart of a process, in which a called function handles a run time error based on an error chain, according to embodiments of the present invention.

FIG. 7 is an exemplary flowchart of a process, in which a called function handles a run time error, according to embodiments of the present invention. At run time, a function is called to perform, at act 710, a pre-determined functionality. A pre-determined functionality may be accomplished either by the means of executing the operations coded in the called function or by the means of calling other functions to perform parts of the pre-determined functionality. When there is no error (determined at act 715), it means both that both the called function itself and other functions called result in no error. In this case, the called function returns, at act 720, to its calling function with a normal status.

When there is an error occurred, determined at act 715, the error may be resulted from either the called function itself or a function that is invoked by the called function. In the former case (error resulted from the called function itself), the called function handles the error between act 725 and act 745 to initiate a new error chain. In the latter case (error resulted from a function called), the called function handles the error between act 750 and 780.

To handle an error resulted from the called function itself, a new error chain is initiated. To do so, the error processing mechanism 645 (in the error handling mechanism 640) first processes, at act 725, the error. Based on the processing result, the context specific error information construction mechanism 665 (see FIG. 5) constructs, at act 730, a context specific error state. With the constructed context specific error state, the error chain appending mechanism 670 issues a request, at act 735, to the run time error chaining mechanism 150 to initiate a new error chain. When the run time error chaining mechanism 150 generates a new error chain containing the context specific error state of the called function, it returns an error token representing the newly initiated error chain. Upon receiving the error token at act 740, the called function returns, at act 745, to its calling function with the error token.

To handle an error resulted from a function called, the error processing mechanism processes, at act 750, the error first. Based on the processing result, the error handling mechanism 640 determines whether to report the error messages in an existing error chain generated by lower level functions (returned by the function called) or to append this existing error chain. To report the errors contained in the returned error chain, the error reporting mechanism 650 uses the error token representing the returned error chain to request, at act 770, the run time error chaining mechanism 150 to retrieve the error chain. When the error chain is received at act 775, the error reporting mechanism 650 reports, at act 780, the error states specific to all the erroneous lower level functions.

To append the error chain represented by the returned error token, the context specific error information construction mechanism 665 constructs, at act 760, an error state specific to the called function. The error chain appending mechanism 670 then requests, at act 765, the run time error chaining mechanism 150 to append the existing error chain. Both the returned error token and the constructed context specific error state are sent to the run time error chaining mechanism 150 with the request. When the existing error chain is appended, the run time error chaining mechanism 150 returns the called function a new error token representing the appended error chain. When the new error token is received, at act 740, the called function returns to its calling function with the new error token.

Figure 8:
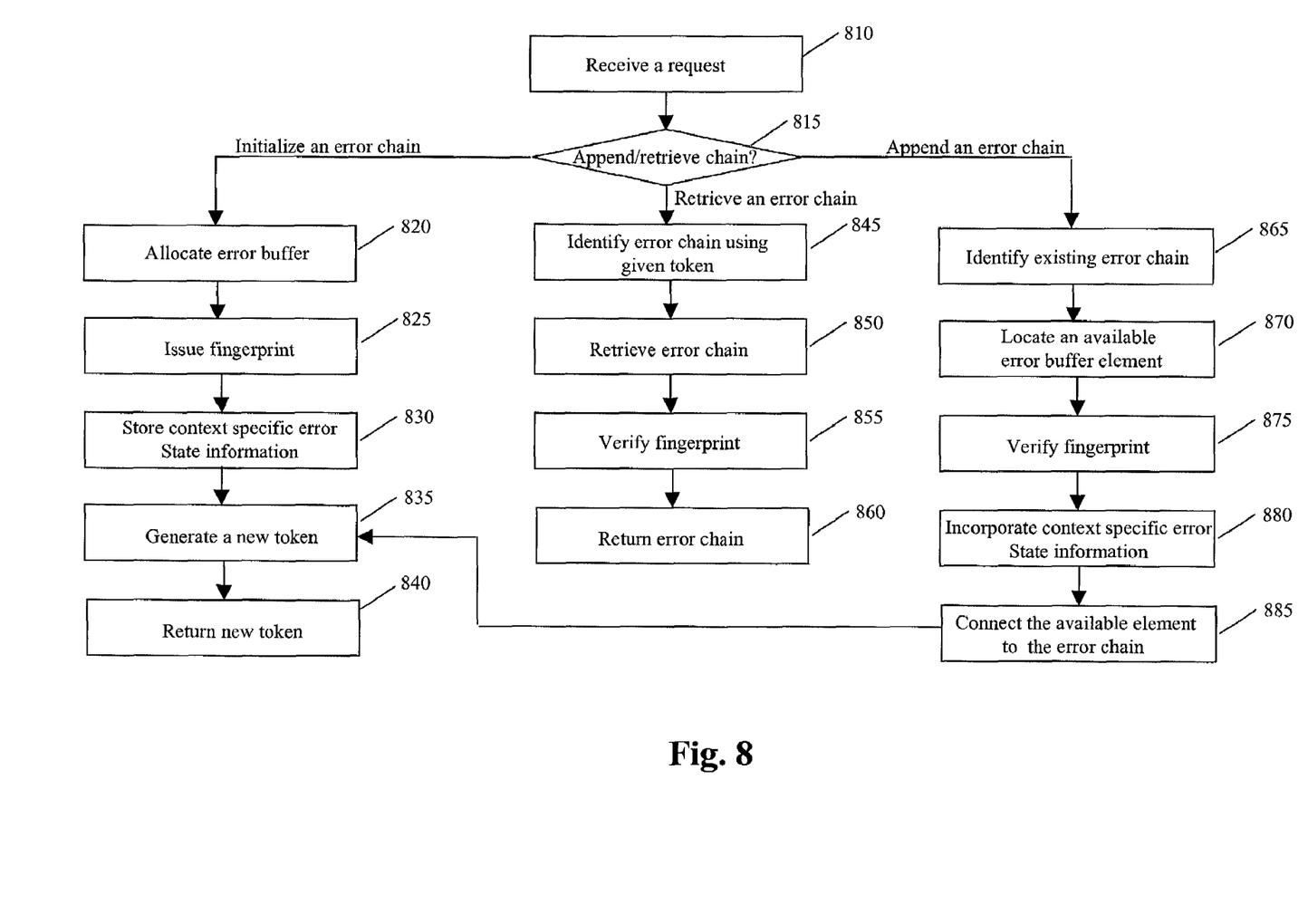
FIG. 8 is an exemplary flowchart of a process, in which a run time error chaining mechanism initiates, appends, and retrieves an error chain at request, according to embodiments of the present invention.

FIG. 8 is an exemplary flowchart of a process, in which the run time error chaining mechanism 150 initiates, appends, and retrieves error chains at request, according to embodiments of the present invention. A request is first received at act 810. The type of service requested is then determined at act 815. In the illustrated flowchart, three different exemplary services are described, including a request to initiate an error chain, to append an existing error chain, and to retrieve an existing error chain.

If the request is to initiate a new error chain, the run time error chaining mechanism 150 first allocates, at act 820, space for the new error chain. A fingerprint is accordingly issued, at act 825, for the new error chain. The context specific error state (received from the requesting function) is stored, at act 830, in the new error chain. Based on the newly issued fingerprint, the run time error chaining mechanism 150 generates, at act 835, a new error token to represent the new error chain and sends, at act 840, the new error token to the requesting function.

If the request is to retrieve an existing error chain, the run time error chaining mechanism 150 first identifies, at act 845, the existing error chain represented by the error token received from the requesting function. The identified error chain is then retrieved at act 850. Prior to sending the retrieved error chain to the requesting function, the run time error chaining mechanism 150 may verify, at act 855, the retrieved error chain based on fingerprint. Such verification may be performed by matching the fingerprint in the error token from the requesting function with the fingerprint in the retrieved error chain. If the two fingerprints are consistent, the retrieved error chain is returned, at act 860, to the requesting function.

If the request is to append an existing error chain, the run time error chaining mechanism 150 first identifies, at act 865, the existing error chain represented by the error token provided by the requesting function. To append the existing error chain, a new available error buffer element is located at act 870. Prior to appending the existing error chain, the run time error chaining mechanism 150 verifies, at act 875, the validity of the available element based on the fingerprints from both the error token and the error chain. If the verification is successful, the run time error chaining mechanism 150 appends the error chain by first incorporating, at act 880, the context specific error state received from the requesting function in the available element and then linking, at act 885, the available element to the error chain. A new error token representing the appended error chain is then generated at act 835 and returned to the requesting function at act 840.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method, comprising:
   performing a first function; and
   generating, if said performing of the first function is in error, a context specific error state; and
   generating an error chain, the error chain being generated based on the context specific error state and represented by an error token,
   wherein the error token includes a fingerprint and an error buffer index pointing at an address where the context specific error state is stored in the error chain.

2. The method according to claim 1, wherein the context specific error state includes at least one of:
   programmatic error information; or
   human readable error information.

3. The method according to claim 2, wherein the programmatic error information includes at least one of:
   local error state;
   global error state; or
   fatal error state.

4. The method according to claim 1, wherein the error chain represented by the error token is passed to a calling function, the calling function having invoked the first function.

5. The method according to claim 4,
   further including generating, by the calling function, a new context specific error state;
   transmitting the new context specific error state and the error token; and
   appending the new context specific error state to the error chain to generate an appended error chain.

6. The method according to claim 5, wherein said appending includes:
   storing the new context specific error state in a new element; and
   linking the new element to the error chain to create the appended error chain.

7. The method according to claim 5, further including
   generating a new error token which represents the appended error chain; and
   transmitting the new error token.

8. A method, comprising:
   receiving a request to append an existing error chain; and
   appending the existing error chain, the existing error chain represented by an error token received with the request, using a context specific error state received with the request to generate the appended error chain represented by a new error token, wherein said appending the existing error chain includes:

identifying an existing element in the existing error chain using the error token;

verifying the validity of the existing element based on a fingerprint of the error token and a fingerprint contained in the existing element; and locating an available element for appending the existing error chain, the available element having an associated new fingerprint.

9. The method of claim 8, further including incorporating, upon a success of said verifying, the context specific error state in the available element; and connecting the available element to the existing element of the error chain to generate the appended error chain.

10. The method according to claim 9, further including generating the new error token with the new associated fingerprint and an error buffer index corresponding to the location of the available element to represent the appended error chain; and returning the new error token.

11. The method according to claim 10, wherein said connecting the available element to the existing error chain includes storing the error token in the available element.

12. The method according to claim 11, wherein said retrieving an existing error chain includes:

identifying an error element leading to the existing error chain using the error token;

retrieving the existing error chain; and returning the retrieved error chain.

13. An error chaining mechanism, comprising:

an error buffer for hosting at least one error chain;

an error chain management mechanism for managing, according to a request, the at least one error chain hosted in the error buffer, the at least one error chain being represented by corresponding error tokens;

a request processing mechanism for processing the request to determine the requested operation to be performed on the at least one error chain; and an error token generation mechanism for generating an error token wherein the error token includes at least one of a fingerprint and an error buffer index pointing at an address where a context specific error state is stored in the at least one error chain.

14. An error chaining mechanism, comprising:

an error buffer for hosting at least one error chain;

an error chain management mechanism for managing, according to a request, the at least one error chain hosted in the error buffer, the at least one error chain be represented by corresponding error tokens;

a request processing mechanism for processing the request to determine the requested operation to be performed on the at least one error chain; and an error token generation mechanism for generating an error token wherein the error token includes at least one of a fingerprint and error buffer index, the error chain management mechanism further including:

a fingerprint verification mechanism for verifying validity of an error chain element prior to appending the error chain element to the at least one error chain; and an error chaining mechanism for linking the error chain element to the at least one error chain to generate a new error chain that contains the error chain element.

15. A machine-accessible medium encoded with data, the data, when accessed, causing a computing device to:

perform a first function;

generate, if said performing of the first function is in error, a context specific error state; and generate an error chain, the error chain being generated based on the context specific error state and represented by an error token, wherein the error token includes:

a fingerprint and an error buffer index pointing at the address where the context specific error state is stored in the error chain.

16. The machine-accessible medium according to claim 15, wherein the context specific error state includes at least one of:

programmatic error information; or human readable error information.

17. The medium according to claim 16, wherein the programmatic error information includes at least one of:

local error state;

global error state; or fatal error state.

18. The medium according to claim 15, wherein the data when accessed, causes the computing device to pass the error chain represented by the error token to a calling function, the calling function having invoked the first function.

19. The medium according to claim 18, wherein the data, when accessed, causes the computing device to generate, by the calling function, a new context specific error state;

transmit the new context specific error state and the error token; and appending the new context specific error state to the error chain to generate an appended error chain.

20. A machine-accessible medium encoded with data, the data, when accessed, causes a computing device to:

receive a request to initiate an error chain from a first function;

initialize a new error chain based on a context specific error state received together with the request;

allocate an error buffer for the new error chain wherein the error buffer includes at least one element;

issue, upon successfully allocating the error buffer, a fingerprint corresponding to an element of the new error chain;

store the context specific error state in the element;

generate a new error token representing the element with the fingerprint and an error buffer index corresponding to the location of the element; and return the new error token.

21. The medium according to claim 20, wherein the data, when accessed, causes the computing device to:

generate, by a calling function which called the first function, a new context specific error state;

receive the new context specific error state and the error token;

identify an existing element in the existing error chain using the error token;

locate an available element for appending the existing error chain, the available element having an associated new fingerprint; and verify the validity of the existing element based on a fingerprint of the error token and a fingerprint contained in the existing element;

generating the new error token with the associated new fingerprint and an error buffer index corresponding to the location of the available element to represent an appended error chain; and returning the new error token.

22. The medium according to claim 21, wherein the data, when accessed, causes the computing device to:
  incorporate, upon a success of said verifying, the context specific error state in the available element; and
  connect the available element to the existing element of the error chain to generate the appended error chain.

* * * * *